Sept. 16, 1941.  D. E. MODE  2,256,347
DEVICE RESPONSIVE TO SUDDEN CHANGES IN ELECTRIC CIRCUITS
Filed June 2, 1939
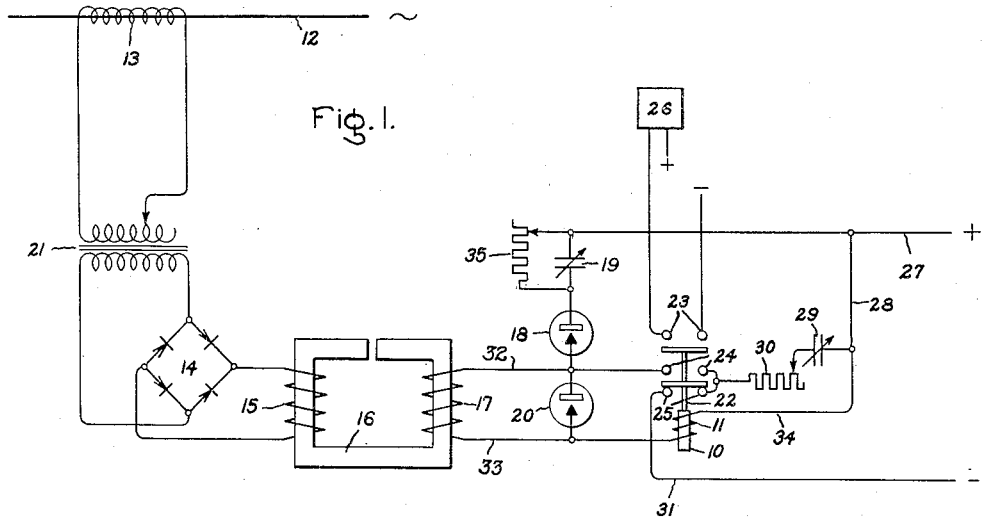
Fig. 1.
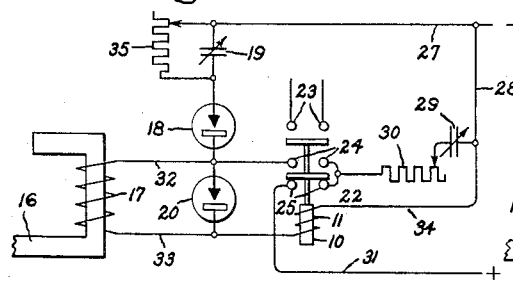
Fig. 2.
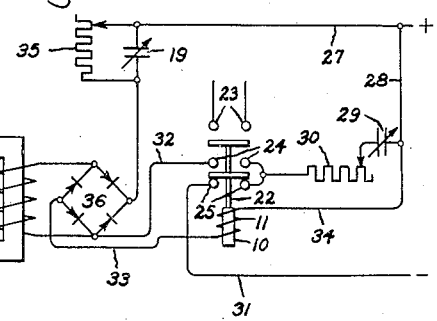
Fig. 3.
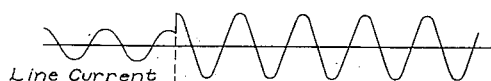
Fig. 4. Line Current
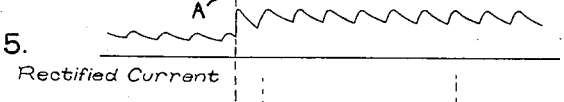
Fig. 5. Rectified Current
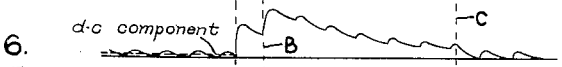
Fig. 6. d-c component Relay Coil Current
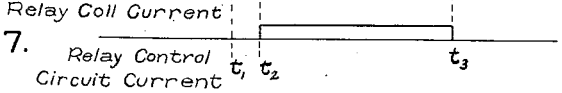
Fig. 7. Relay Control Circuit Current
Inventor:
Douglas E. Mode,
by Harry E. Dunham
His Attorney.

Patented Sept. 16, 1941

2,256,347

UNITED STATES PATENT OFFICE 2,256,347

DEVICE RESPONSIVE TO SUDDEN CHANGES IN ELECTRIC CIRCUITS

Douglas E. Mode, Philadelphia, Pa., assignor to General Electric Company, a corporation of New York Application June 2, 1939, Serial No. 277,014

11 Claims. (Cl. 175—294)

My invention relates to improvements in devices responsive to sudden changes in electric circuits and more particularly to relaying devices which operate in dependence on the rate and magnitude of change of the effective value of an alternating current. More specifically, my invention relates to improvements in sudden change responsive devices of the type disclosed in a copending application of Claude D. Hayward Serial No. 277,013, filed June 2, 1939, assigned to the same assignee as this invention. The principal object of my invention is to provide an improved electroresponsive device which is sensitive to sudden changes in an alternating current without responding falsely when the rate and magnitude of change of the current are below given values and which has a response substantially independent of the magnitude of the alternating current immediately preceding the occurrence of a sudden change therein. This and other objects of my invention will appear in more detail hereinafter.

In the protection of power supply and distribution circuits for electric railway systems there arises the problem of distinguishing between heavy loads, such as occur in starting trains, especially after restoration of electric service following an interruption therein, and faults, such as short-circuits. The characteristics of most protective relays, for example distance relays, are such that they cannot distinguish between such heavy loads and faults and unnecessary service interruptions are likely to occur. In order to avoid these, it is desirable to set such protective relays so that they will not operate on heavy loads but in case of faults will automatically have their characteristics so changed as properly to respond and effect a clearing of the fault. Inasmuch as the faults are usually accompanied by sudden changes in current whereas in heavy loads the changes are much more gradual, this provides a criterion for more effective protection if a satisfactory device for such discrimination is available. In accordance with my invention, I provide an electroresponsive relay device which discriminates between sudden changes in current, such as accompany faults, and the slower changes or the sudden changes of relatively small magnitude which accompany loads, substantially independently of the magnitude of the current immediately preceding the sudden change. Electro-responsive devices embodying my invention may then be used to control the characteristics of protective relays, such for example as distance relays, by introducing more impedance or resistance in the voltage circuits of the ohm and starting units of the relay or by changing taps on small auxiliary transformers supplying the voltage coils of these units of the relay so as to render it more sensitive, when sudden current changes exceeding a predetermined magnitude occur, than is normally the case. In the application outlined it will be apparent that, if the response of any sudden change responsive device is dependent on the magnitude of the load current immediately preceding the sudden change, the desired action or relay setting control which the sudden change responsive device is used to accomplish may be impaired. My invention, however, is not limited in its scope of application to the relaying system just described.

My invention will be better understood from the following description when considered in connection with the accompanying sheet of drawings, and its scope will be pointed out in the appended claims.

In the accompanying drawing Fig. 1 illustrates diagrammatically an embodiment of my invention in a device responsive to a predetermined increase in magnitude of an alternating current at a rate of change above a predetermined value; Fig. 2 illustrates diagrammatically an embodiment of my invention in a device responsive to a predetermined decrease in magnitude of an alternating current at a rate of change above a predetermined value; Fig. 3 illustrates diagrammatically an embodiment of my invention in a device responsive to a predetermined increase or decrease in magnitude of an alternating current at a rate of change above a predetermined value; and Figs. 4, 5, 6 and 7 are current wave diagrams explanatory of the embodiments of my invention shown in Figs. 1, 2 and 3.

In the embodiment of my invention shown in Fig. 1 an electroresponsive device which may be of a relatively simple type, such for example as an electromagnetic means or relay 10 having a single actuating winding 11, is to be operated in response to a predetermined change in magnitude at a rate of change above a predetermined value of an alternating current assumed to be energizing a circuit, such as a power line conductor 12. In order to obtain the desired operation, a sample of the line current is obtained through suitable means, such as a current transformer 13. This sample of current, which is proportional to the line current, is then rectified by suitable rectifying means 14 shown as full wave. The rectified current thus obtained is supplied to one winding 15 of a two winding transformer 16 whose core is designed to provide substantially constant mutual magnetic coupling between the windings and whose other winding 17 includes in series relation therewith an electric valve means 18, suitable impedance means, such as a condenser 19, which may be adjustable, as indicated, and the actuating winding 11 of the relay 10. If the relay is to respond only to an increase in current, then the electric valve means 18 should pass current in only one direction which corresponds to an increase in the effective value of the current in the line conductor 12, as shown in Fig. 1.

With this arrangement it is desirable to have a relatively low impedance path in case of a sudden decrease of the current in the line conductor 12. Accordingly, there may be connected across the winding 17 of the transformer 16 a one-way electric valve means 20 which acts as a by-pass for current waves appearing in the transformer winding 17 in consequence of a sudden decrease of the current in the conductor 12. If the current transformer 13 is of the usual type employed in the protection of alternating current circuits and it is desired to use, for example, dry disk type rectifiers in the rectifying means 14, then an intermediate step down current transformer 21 may be used to bring the sample current in line with the rating of commercially available rectifiers. One of the windings of this transformer may be conveniently provided with taps, as indicated schematically, for adjusting the current value required to operate the relay 10.

As shown, the movable circuit controlling member 22 of the relay 10 is arranged to control two sets of circuit closing contacts 23 and 24 and one set of circuit opening contacts 25. The circuit closing contacts 23 may be in the circuit of any device 26 whose operation is to be modified or effected in response to a sudden change in the current in the conductor 12. Thus, for example, the device 26 may be a circuit breaker trip coil, an indicating or alarm device, or it may include an arrangement for changing the distance sensitivity of response of a distance relay, etc.

Since the current impulse which effects the operation of the relay 10 is of only momentary duration, means are provided for maintaining the relay 10 in the actuated position long enough to insure a completion of the controlling operation started by the relay. As shown, this means includes a suitable time constant circuit normally energized from a D. C. source and including conductors 27, 28, a condenser 29, which may be adjustable, as indicated, a leak resistance 30, which may also be adjustable, as indicated, the normally closed circuit opening contacts 25 of the relay 10 and a conductor 31. When the relay 10 operates and closes its contacts 24, the charge on the condenser 29 leaks off in a circuit including the relay contacts 24, a conductor 32, the transformer windings 17, a conductor 33, the relay winding 11, a conductor 34, the condenser 29 and the resistance 30.

Referring now to Figs. 4–7, inclusive, the alternating line current is shown in Fig. 4 with a moderate initial value, as appears at the left of the dotted line A, corresponding, for example, to a steady load current. At some instant $t_1$, indicated by the dotted line A, this current suddenly increases to a large value, as shown at the right of the broken line A, due, for example, to the occurrence of a fault on the system of which the line conductor 12 is a part. As shown in Fig. 1, the line current, or more correctly a current proportional thereto, is rectified by the rectifier 14 and supplied to the winding 15 of the impulse transformer 16. The wave form of the rectifier current is shown in Fig. 5. It will be observed that its otherwise pulsating wave form is smoothed to a moderate ripple by the action of the inductance of the impulse transformer 16 previously to the instant $t_1$ and again at a higher level shortly thereafter. At the instant $t_1$ the rectified current suddenly increases by an amount corresponding to the increase in the line current. This sudden increase induces a pulse of current in the circuit of the winding 17 of the impulse transformer 16. If this increase is sufficiently great, it will effect the operation of the relay 10.

The ripple in the rectified current shown at the left of the line A in Fig. 5 induces a similar ripple in the circuit of the winding 17 of the impulse transformer 16. This ripple, supplied through the rectifiers 18 and 20, causes a series of half-wave pulses to flow in the winding 11 of the relay 10. The inductance of this winding tends to smooth these pulses and to cause more or less direct current to circulate in the relay coil through the rectifier 18. This circulating current is proportional to the initial load current, and since it aids the induced pulse in picking up the relay, it causes a drooping pick-up increment load characteristic. In other words, a smaller increment of current tends to cause pick up when the initial load current is high than when it is low. Blocking this circulating direct current by the condenser 19 tends to cause the pick-up increment-load characteristic to rise because the aiding effect of this circulating current is absent and also because the consequent increase in flux in the impulse transformer core tends to cause partial saturation. The wave of the relay coil current, shown in Fig. 6, shows the cyclic pulses and the small D. C. component due to the initial load.

At the instant $t_1$ the impulse induced by the input current increment causes the relay 10 to pick up and close its contacts at an instant $t_2$ indicated by the dotted line B, as shown in Fig. 6. The closing of the contacts 24 connects the condenser 29 from the station battery supply where it has been kept charged, as previously pointed out, to the relay winding 11. This causes a second pulse of current to appear in the wave of the coil current, as shown immediately to the right of the line B in Fig. 6. This, of course, decays exponentially, as shown, at a rate controlled by the resistance 30. When the relay coil current has decayed to a certain value, the relay drops out again at an instant $t_3$, indicated by the dotted line C. The operation of the relay main circuit closing contacts 23 is illustrated by the wave of the relay control circuit current, shown in Fig. 7, between the instants $t_2$ and $t_3$ on the assumption, of course, that the control circuit does not include any contacts other than the relay contacts 23.

Since there arise occasions in which a rising or falling pick-up increment-load characteristic would be unsatisfactory, I provide, in accordance with my invention, means which renders the response of the relay 10 substantially independent of the magnitude of the alternating current immediately preceding the sudden change therein. For this purpose I may connect in parallel with the condenser 19 suitable impedance means, such as a resistance 35, which may be adjustable, as indicated. In this way the heretofore discussed blocking action of the condenser 19 on the circulating direct current in the winding of the relay circuit is prevented from raising the pick-up increment load characteristic by virtue of the by-passing action of the resistance 35. Consequently, the response of the relay 10 in case of a sudden change in the alternating current in the line conductor 12 on the occurrence of a sudden change therein is substantially uninfluenced by the magnitude of the alternating current immediately preceding the sudden change. In other words, the pick-up of the relay is made substantially solely dependent on a predetermined change in the magnitude of the effective value of the current when the rate of such change exceeds a predetermined value.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. A device responsive to sudden changes in an alternating current comprising means for rectifying said current, a transformer comprising two windings one of which is connected to be energized by said rectified current, electromagnetic means comprising a movable member and an actuating coil connected to be energized from the other of said transformer windings operative when supplied with current above a predetermined value to move said member from one position to another, and means for maintaining the response of said electromagnetic means substantially independent of the magnitude of the alternating current immediately preceding the occurrence of a sudden change therein.

2. A device responsive to sudden changes in an alternating current comprising means for rectifying said current, a transformer comprising two windings one of which is connected to be energized by said rectified current, electromagnetic means comprising a movable member and an actuating coil connected to be energized from the other of said transformer windings operative when supplied with current above a predetermined value to move said member from one position to another, and a condenser and a resistance connected in parallel with each other and in series with said coil and said other transformer winding for maintaining the response of said electromagnetic means substantially independent of the magnitude of the alternating current immediately preceding a sudden change therein.

3. A device responsive to sudden changes in an alternating current comprising means for rectifying said current, a transformer comprising two windings one of which is connected to be energized by said rectified current, electroresponsive means connected to be energized from the other of said transformer windings operative when alternating current supplied to said rectifying means has a predetermined change in magnitude at a rate of change above a predetermined value, and means for maintaining the response of said electroresponsive means substantially independent of the magnitude of the alternating current immediately preceding the sudden change therein.

4. A device responsive to sudden changes in an alternating current comprising means for rectifying said current, a transformer comprising two windings one of which is connected to be energized by said rectified current, electroresponsive means connected to be energized from the other of said transformer windings operative when alternating current supplied to said rectifying means decreases a predetermined amount at a rate of change above a predetermined value, and means for maintaining the response of said electromagnetic means substantially independent of the magnitude of the alternating current immediately preceding the sudden change therein.

5. A device responsive to sudden changes in an alternating current comprising means for rectifying said current, a transformer comprising two windings one of which is connected to be energized by said rectified current, an electroresponsive means comprising a movable member and an actuating coil connected to be energized from the other of said transformer windings operative when alternating current supplied to said rectifying means has a predetermined change in magnitude at a rate of change above a predetermined value to move said member from one position to another, means for delaying the return of said member to its initial position for a predetermined time after the occurrence of the sudden change in the alternating current, and means for maintaining the response of said electroresponsive means substantially independent of the magnitude of the alternating current immediately preceding the sudden change therein.

6. A device responsive to sudden changes in an alternating current comprising means for rectifying said current, a transformer comprising two windings one of which is connected to be energized by said rectified current, electromagnetic means comprising a movable member and an actuating coil connected to be energized from the other of said transformer windings operative to move said member from one position to another when alternating current supplied to said rectifying means has a predetermined change in magnitude at a rate of change above a predetermined value, and means for maintaining the response of said electromagnetic means substantially independent of the magnitude of the alternating current immediately preceding the sudden change therein comprising a condenser and a resistance in parallel with each other and in series relation with said other transformer winding.

7. A device responsive to sudden changes in an alternating current comprising means for rectifying said current, a transformer comprising two windings one of which is connected to be energized by said rectified current, electromagnetic means comprising a movable member and an actuating coil connected to be energized from the other of said transformer windings operative to move said member from one position to another when alternating current supplied to said rectifying means has a predetermined change in magnitude at a rate of change above a predetermined value, and a condenser and a resistance connected in parallel with each other and in series relation with said other transformer winding, the ohmic values of said resistance and condenser being so proportioned relatively to each other and the other electrical factors of the circuit including said other winding and the winding of said electromagnetic means as to maintain the response of said electromagnetic means substantially independent of the magnitude of the alternating current immediately preceding the sudden change therein.

8. A device responsive to sudden changes in an alternating current comprising means for rectifying said current, a transformer comprising two windings one of which is connected to be energized by said rectified current, electroresponsive means connected to be energized from the other of said transformer windings operative when alternating current supplied to said rectifying means increases a predetermined amount at a rate of change above a predetermined value, and means for maintaining the response of said electromagnetic means substantially independent of the magnitude of the alternating current immediately preceding the sudden change therein.

9. A device responsive to sudden changes in an alternating current comprising means for rectifying said current, a transformer comprising two windings one of which is connected to be energized by said rectified current, electroresponsive means connected to be energized from the other of said transformer windings operative when alternating current supplied to said rectifying means increases or decreases a predetermined amount at a rate of change above a predetermined value, and means for maintaining the response of said electromagnetic means substantially independent of the magnitude of the alternating current immediately preceding the sudden change therein.

10. A device responsive to alternating current changes of more than a predetermined amount which occur at a rate of change above a predetermined value comprising means for producing a voltage having a magnitude dependent upon the amount and rate of change of said current, means controlled by said voltage and operative when said voltage exceeds a predetermined value, and means for maintaining the response of said controlled means independent of the magnitude of the alternating current immediately preceding a sudden change therein.

11. A device responsive to alternating current changes of more than a predetermined amount which occur at a rate of change above a predetermined value comprising means for producing a voltage having a magnitude dependent upon the amount and rate of change of said current and having a polarity dependent upon whether said current change is an increase or decrease, means controlled by said voltage and operative when said voltage is at a predetermined polarity and exceeds a predetermined value, and means for maintaining the response of said controlled means independent of the magnitude of the alternating current immediately preceding a sudden change therein.

DOUGLAS E. MODE.